United States Patent [19]

Carson

[11] 4,399,260

[45] Aug. 16, 1983

[54] INCREASING THE REACTIVITY OF COUPLING OF BLOCK POLYMERS

[75] Inventor: William G. Carson, Cuyahoga Falls, Ohio

[73] Assignee: The Goodyear Tire & Rubber Company, Akron, Ohio

[21] Appl. No.: 337,037

[22] Filed: Jan. 4, 1982

[51] Int. Cl.$^3$ .............................................. C08F 8/40
[52] U.S. Cl. .................................... 525/340; 525/375; 525/379; 525/382; 525/384; 525/385; 526/173; 526/336
[58] Field of Search ............... 525/340, 375, 379, 382, 525/384, 385; 526/173, 336

[56] References Cited

U.S. PATENT DOCUMENTS

| | | | |
|---|---|---|---|
| 3,363,659 | 1/1968 | Keckler et al. | 152/330 |
| 3,639,517 | 2/1972 | Kitchen et al. | 260/879 |
| 3,855,189 | 12/1974 | Farrar et al. | 260/85.1 |
| 3,911,054 | 10/1975 | Roest et al. | 260/880 B |
| 3,931,126 | 1/1976 | Naylor | 260/83.7 |
| 3,949,020 | 4/1976 | Prudence | 260/879 |
| 3,951,931 | 4/1976 | Burchard et al. | 260/879 |
| 4,163,764 | 8/1979 | Nash | 525/2 |
| 4,304,886 | 12/1981 | Bean, Jr. et al. | 525/314 |

Primary Examiner—Joseph L. Schofer
Assistant Examiner—Bernard Lipman
Attorney, Agent, or Firm—Alvin T. Rockhill

[57] ABSTRACT

There is disclosed a process for the preparation of thermoplastic block polymers which comprises contacting conjugated diolefinic monomers selected from the group consisting of isoprene, piperylene, 2-ethyl-1,3-butadiene, 2,3-dimethyl-1,3-butadiene and 1,3-butadiene, and the like, mixed with at least one polyvinyl aromatic coupling compound selected from the group of o, m and p-divinylbenzene, 1,2,4-trivinylbenzene, 1,8-divinylnaphthalene, 1,2-divinyl-3,4-dimethylbenzene, 2,4-divinylbiphenyl, 3,5,4'-trivinylbiphenyl and 1,3,5-trivinylbenzene under solution polymerization conditions with a polystyryllithium catalyst which has been prepared by reacting an alkyllithium compound with a styrene monomer selected from the group consisting of styrene, alpha-methylstyrene, p-methylstyrene, p-t-butylstyrene, 3-methylstyrene, 1-vinylnaphthalene, and the like, in which an amount of polyvinyl aromatic coupling compound ranges from about 1.0 to about 6 vinyl groups of the polyvinyl aromatic coupling compound per mole of active lithium catalyst used, in which the living block copolymer is treated with (A) a polar compound selected from the group consisting of ethylene glycol dimethyl ether (glyme), diethylene glycol dimethyl ether (diglyme), triethylene glycol dimethyl ether (triglyme), tetraethylene glycol dimethyl ether tetraglyme), 2,3-dimethoxybutane, N,N,N',N'-tetramethylethylene-diamine (TMEDA), tri-n-butylphosphine and hexamethylphosphoric triamide (HMPA), in which the molar ratio of the said polar compounds to the active lithium ranges from about 0.01/1 to about 20/1 or (B) a polar compound selected from the group consisting of tetrahydrofuran, diethyl ether, triethylamine, 1,4-diazabicyclo-2.2.2-octane (DABCO), p-dioxane, tri-n-butylamine and N,N'-dimethylpiperazine, in which the molar ratio of the said polar compounds to the active lithium ranges from about 0.5/1 to about 100/1.

10 Claims, No Drawings

INCREASING THE REACTIVITY OF COUPLING OF BLOCK POLYMERS

FIELD OF THE INVENTION

This invention is directed to the preparation of thermoplastic block copolymers. More particularly, this invention is directed to a method of preparing thermoplastic block copolymers using divinylbenzene (DVB) as a coupling agent and using certain polar compounds to post-treat such polymers for enhancing coupling.

BACKGROUND OF THE INVENTION

In U.S. Pat. No. 3,949,020, issued Apr. 6, 1976, there is disclosed and claimed a process for the preparation of thermoplastic block copolymers by contacting conjugated diolefinic monomers mixed with divinylbenzene, under solution polymerization conditions, with a polystyryllithium catalyst, the amount of said divinylbenzene varying from about 0.5/1 to about 25/1 of divinylbenzene/active lithium molar ratio, a more preferred range is 2/1 to 10/1, whereby the resulting thermoplastic block copolymer is a non-gel and has the divinylbenzene coupling agent attached to the diolefinic portion of said copolymer block.

The procedure disclosed in U.S. Pat. No. 3,949,020 results in thermoplastic elastomeric block copolymers. These block copolymers are usually known as ABA or as SBS or SIS (polystyrene-polybutadiene-polystyrene or polystyrene-polyisoprene-polystyrene) block copolymers. The molecular weight of the polystyrene portions may range from about 7000 to about 50,000, the diolefinic portion can range from about 10,000 to about 100,000. Because the block polymers prepared in accordance with the process are branched, they process much more readily than their linear counterparts. They are useful in the preparation of a host of finished products ranging from relatively soft, weak tensile adhesive substrates through thermoplastic elastomer products and even into plastic materials. These block copolymers can be heated, molded or shaped and then allowed to cool to a tough, useable material which exhibits properties of cured or vulcanized polymers, even though they are not required to be vulcanized. Shoe soles are an example. Other uses for such polymers are in adhesives and in films.

The use of an organolithium as an initiator results in a polymer chain that is described as "living". By the term "living polymer" is meant the product of a polymerization which has no termination or transfer reaction. Thus, the polymer chains have lithium atoms attached to the chain and even when all the monomer is consumed, if additional monomer is added, the polymerization will continue with the new monomer adding on to the already existing chains until it also is consumed. Thus, in the simplest case possible, in using the usual coupling agents, two living polymers, 2(A-B-), can be coupled to give a polymer having a molecular weight equal to the sum of the polymers (A-B-B-A). With a living polymer system, it is necessary to have a system free of impurities in order to avoid termination of the growing polymer chain with adventitious impurities found in the usual coupling agents. There is much disclosure in the prior art on coupling living polymers using coupling agents. Also, there are many problems associated with coupling polymers in a living polymer system. When coupling a lithiated system, the most serious concern of those skilled in the art is that a diblock polymer (A-B) will result rather than many block segments being connected by the coupling agent, if the lithium should prefer to react with some other material, i.e., an impurity rather than with the coupling agent.

U.S. Pat. No. 3,639,517, issued Feb. 1, 1972, discloses a process for the preparation of resinous branched copolymers comprising sequential steps of (A) contacting under polymerization conditions a monovinyl substituted aromatic hydrocarbon such as, for instance, styrene in an amount to provide from 40 to 90 weight percent of the total monovinyl substituted aromatic hydrocarbon employed in preparing the copolymer for a time sufficient to polymerize substantially all of the monovinyl substituted aromatic hydrocarbon; then (B) charging to the polymerization reaction product of step (A) the remaining monovinyl substituted aromatic hydrocarbon monomer representing from 10 to 60 weight percent of total monovinyl substituted aromatic hydrocarbon monomer employed in preparing said copolymer, adding additional organolithium initiator, and (C) charging to the polymerization reaction product of step (B) a conjugated diene monomer such as, for instance, butadiene, and polymerizing to essential completion the diene monomer in the presence of said reaction product of step (B) to form a block copolymer and (D) charging to the polymerization reaction product of step (C) a polyfunctional treating agent capable of reacting the terminal lithium atoms on a preformed polymer to form a branched polymer wherein said polyfunctional treating agent is employed in an amount to provide about 0.05 to 2 equivalent of the polyfunctional treating agent per gram atoms of lithium. It is said that the polyfunctional treating agent can be polyisocyanate such as benzene-1,2,4-triisocyanate, polyepoxide, such as epoxidized linseed oil, a polyketone or a polyvinyl aromatic compound such as divinylbenzene.

The invention of U.S. Pat. No. 3,949,020 overcomes the problems of impurities entering into the system by what was then an unobvious and novel method of block polymer preparation. The polymerization system of U.S. Pat. No. 3,949,020 does not expose the polymerization system to the chance deactivation of the polymer-lithium moiety by the impurities. The coupling agent is introduced into the polymerization system at the beginning of the diolefin polymerization rather than after the living polydiolefin-lithium chains have been formed and, therefore, susceptible to premature termination.

There is disclosed in U.S. Pat. No. 3,363,659, issued Jan. 16, 1968, the polymerization of butadiene with an alkyl lithium catalyst and the use of from about 0.025 to about 0.4 parts by weight of a comonomer such as divinylbenzene.

In U.S. Pat. No. 3,855,189, issued Dec. 17, 1974, there is disclosed the preparation of a random copolymer of, for instance, butadiene and styrene in which (1) introducing into a polymerization zone at least on polymerizable monomer selected from the group of conjugated dienes, polymerizable monovinyl-substituted aromatic compounds and mixtures, under polymerization conditions employing organolithium initiator; (2) polymerizing said polymerizable monomer with said organolithium initiator, forming polymer-lithium moieties; (3) treating the resulting polymerization mixture with at least one polar compound in a minor amount effective to improve coupling of said polymer-lithium, wherein said polar compound is ether, thioether, tertiary amine or triazine, or mixtures thereof; (4) treating said polymerization reaction system with at least one polyvinyl aromatic compound in a minor amount effective to couple said polymer-lithium moieties, wherein said polar compound is added to the polymerization mixture prior to or coincidentally with said polyvinyl aromatic compound. This patent teaches the use of commercial divinylbenzene as the polyvinyl aromatic compound.

The present invention distinguishes from the process of the aforementioned patent in that the disclosure in the aforementioned patent is the formation of random copolymers a diolefin monomers and vinylaromatic compounds or, as is indicated, the preferred polymers include polybutadiene, rubbery butadiene-styrene copolymers of low vinyl unsaturated content. The aforementioned patent suggests that many things, such as potassium salts of alcohols or phenols can be employed to randomize the copolymerization of conjugated dienes and monovinyl substituted aromatic compounds. Furthermore, the process of the present invention distinguishes from this reference in that the polymerization of this reference is complete prior to the addition of the polyvinyl aromatic compound. If such order of addition were employed in the process of the present invention, there would be a serious problem of deactivating the polystyrene-polybutadiene-lithium block prior to coupling of two or more SB or AB blocks to form SBS or ABA block polymers.

However, the process of U.S. Pat. No. 3,949,020 is not without its deficiences.

Due to the fact that some residual unreacted divinylbenzene and also due to the fact that commercial divinylbenzene, a mixture of isomers, is a relatively impure product, usually containing up to not more than 55 percent divinylbenzene, with ethylvinylbenzenes (EVB) and diethylbenzenes (DEB) being the major impurities, there is a residue of divinylbenzene, ethylvinylbenzene and diethylbenzene left in the thermoplastic block polymers after they have been isolated, which causes a slight odor to remain in the block polymers.

A typical example of the preparation of a block copolymer by the process of U.S. Pat. No. 3,949,020 is that a polystyryllithium initiator of 12,500 molecular weight was prepared by polymerizing styrene with butyllithium. For instance, 200 milliliters (ml) of styrene and 700 ml of cyclohexane were passed through a silica gel bed and sparged with nitrogen. Afterwards, there was contained 33.3 grams (g) of styrene in each 170 ml of solution. To this solution was added 2.6 ml of 1.05 N-butyllithium and the resulting polymerization resulted in a polystyryllithium of 12,500 molecular weight and a 0.0152 normality. Liquified butadiene (350 ml) and 2650 ml of cyclohexane were passed through a silica gel bed and sparged with nitrogen gas, resulting in a solution having 8.4 g of butadiene per 165 ml of solution. Into a series of bottles was placed 165 ml of solution of cyclohexane containing 8.4 g of butadiene. To each of these bottles was added 0.4 ml of 0.2 N-butyllithium to act as a scavenger, after which was added 0.3 ml of divinylbenzene (3.78 molar of a 55 percent solution of divinylbenzene dried over calcium sulfate, giving a DVB/lithium ratio equal to 5/1). Subsequently, there was added 15 ml of the above prepared polystyryllithium giving a polybutadiene having a kinetic molecular weight of 40,000. The solution was allowed to react for 40 minutes at 65° C., after which a methanol solution of a phenolic antioxidant was added to the mixture to stop the further polymerization. The polymer was isolated, air dried, and then vacuum dried to give approximately 99.6 percent by weight yield. The polymer was clear and colorless. It had a dilute solution viscosity in toluene at 30° C. of 1.1 and the percent gel was 3.8. The polymer was readily soluble in benzene. When molded or remolded at 149° C., the polymer had a tensile strength of 19581.8 kPa at 905 percent elongation. However, such a polymer does present a small problem in that there is a slight odor, reminiscent of divinylbenzene.

It has been determined that up to about one-third of the divinylbenzene (DVB) remains unreacted after a practical polymerization time has elapsed. This remaining unreacted divinylbenzene results in an odor problem during the finishing operation of isolating the polymer from solution and a slight residual odor associated with the dried polymer.

Thus, it is desirable to, in some manner, increase the efficiency of the divinylbenzene coupling reaction. It is also desirable that the level of the divinylbenzene required in the coupling reaction be lowered. If such could be accomplished, there would be a resulting lowering of the material cost and a reduction in the residual odor of the polymer.

SUMMARY OF THE INVENTION

A process for the preparation of thermoplastic block polymers which comprises contacting conjugated diolefinic monomers selected from the group consisting of isoprene, piperylene, 2-ethyl-1,3-butadiene, 2,3-dimethyl-1,3-butadiene and 1,3-butadiene, and the like, mixed with at least one polyvinyl aromatic coupling compound selected from the group of o, m and p-divinylbenzene, 1,2,4-trivinylbenzene, 1,8-divinylnaphthalene, 1,2-divinyl-3,4-dimethylbenzene, 2,4-divinylbiphenyl, 3,5,4'-trivinylbiphenyl and 1,3,5-trivinylbenzene under solution polymerization conditions with a polystyryllithium catalyst which has been prepared by reacting an alkyllithium compound with a styrene monomer selected from the group consisting of styrene, alpha-methylstyrene, p-methylstyrene, p-t-butylstyrene, 3-methylstyrene, 1-vinylnaphthalene, and the like, in which an amount of polyvinyl aromatic coupling compound ranges from about 1.0 to about 6 vinyl groups of the polyvinyl aromatic coupling compound per mole of active lithium catalyst used, in which the living block copolymer is treated with (A) a polar compound selected from the group consisting of ethylene glycol dimethyl ether (glyme), diethylene glycol dimethyl ether (diglyme), triethylene glycol dimethyl ether (triglyme), tetraethylene glycol dimethyl ether (tetraglyme), 2,3-dimethoxybutane, N,N,N',N'-tetramethylethylene-diamine TMEDA), tri-n-butylphosphine and hexamethylphosphoric triamide (HMPA), in which the molar ratio of the said polar compounds to the active lithium ranges from about 0.01/1 to about 20/1 or (B) a polar compound selected from the group consisting of tetrahydrofuran, diethyl ether, triethylamine, 1,4-diazabicyclo-2.2.2-octane (DABCO), p-dioxane, tri-n-butylamine and N,N'-dimethylpiperazine, in which the molar ratio of the said polar compounds to the active lithium ranges from about 0.5/1 to about 100/1.

Another way of stating the invention is that it is a process for the preparation of thermoplastic block copolymers comprising contacting conjugated diolefinic monomers mixed with an amount of divinylbenzene under solution polymerization conditions with a polystyryllithium catalyst, said amount of the vinyl groups in the divinylbenzene or other coupling agents varying from about 1.01/1 to about 6/1 per mole of active lithium moles in the polymer or catalyst used, allowing the formation of a polystyrene-polydiolefin diblock polymer to be thereby prepared, producing a diblock polymer-lithium moiety. Then said diblock copolymer-lithium moiety are contacted with the polar compound so that the reaction efficiency of the coupling of the diolefinic polymeric portions of the diblock polymers with the divinylbenzene or its equivalent is markedly increased. In fact, improvements of up to 99% reaction efficiency of divinylbenzene and up to 65 percent reaction efficiency of EVB have been obtained by such a technique.

DETAILED DESCRIPTION OF INVENTION

The polymerization reaction is usually carried out in an inert solvent such as a hydrocarbon. It has been found, however, that all hydrocarbons will not be conducive for the practice of the instant invention. Those skilled in block copolymers will be aware of the useful inert solvents. Some hydrocarbons that can be utilized in this invention are benzene, toluene, cyclohexane, cyclopentane and methylcyclopentane.

If the coupling agent (DVB) were introduced to the diolefin solution prior to contacting with the polystyryllithium initiator it would be expected that a large amount of gelled material would be built into the polymer. Since the nature of branching agents is multifunctional, the incorporated divinylbenzene (DVB) would contain a residual double bond which would be susceptible to crosslinking. However, it has been unexpectedly discovered that the block polymer produced by the method of this invention is not appreciably crosslinked or gelled and that most of the branching agent is found on the end of the diolefin block. The terminal lithium may react with the pendant vinyl groups of the DVB present in one or more polymer chains to give a thermoplastic block polymer.

The polystyryllithium catalyst useful in the practice of this invention are any that correspond to the formula RLi, in which R is polystyrene prepared by reacting alkyllithium with a styrene monomer solution forming polystyrene with a lithium atom at one end of the styrene chain. The alkyllithiums which can be utilized in the instant invention are n-butyllithium, sec-butyllithium, isopropyllithium, amyllithium, etc. Similarly, substituted styrenes instead of styrene may be employed such as α-methylstyrene, which is preferred, p-t-butylstyrene, or other substituted styrenes may be used in place of styrene, also preferred. For instance, if a styrene-butadiene block copolymer branched at the terminal end of the polybutadiene block to other styrene-butadiene units is to be prepared, the n-butyllithium is reacted with a styrene solution to make a polystyryllithium catalyst which can then be added to a butadiene solution containing the branching agent and polymerizing the butadiene solution until the desired block polymer is formed.

It should be understood that the molecular weight of the polystyrene (R) in the polystyryllithium catalyst can be determined by one skilled in the art and therefore no specific molecular weight need be set down.

The monomers that can be utilized in this invention with the polystyryllithium catalyst to produce the thermoplastic block polymers are diolefins containing from four carbon atoms to about 12 carbon atoms such as isoprene, piperylene, 2-ethyl-1,3-butadiene, 2,3-dimethyl-1,3-butadiene, 1,3-butadiene, and the like. Isoprene and butadiene are preferred.

In prior art methods of coupling lithium terminated block polymers, a very exact stoichiometry must be maintained between the coupling agent and the terminal polymer lithium. In those methods, the coupling agent is added after the formation of the (still living) lithium terminated (A-B-) block polymer. Extreme care must be taken that terminating impurities in the coupling agent are absent or are not introduced with it. Otherwise, terminated diblock polymers will result. Likewise, a deficiency or excess of coupling agent, such as $SiCl_4$ or $CHCl_3$, will also result in diblock polymer. It is widely known to those skilled in the art that even small amounts of diblocks will significantly reduce the tensile strength of the coupled block polymer.

In the instant invention, the need to maintain an extremely strict stoichiometry between the coupling agent and the active terminal lithium has been eliminated. The coupling agent/active lithium ratio can range from about 1.0/1 to about 6/1. A more preferred ratio of coupling agent/active lithium is from about 2/1 to about 4/1.

The molecular weight of the polystyrene block and the molecular weight of the polydiolefin block can range quite broadly. Also, the weight ratio between the polystyrene and the polydiolefin can range quite broadly. The polystyrene block molecular weight can range from about 7,000 to about 50,000. The polydiolefin block molecular weight, ignoring the effect of DVB, can range from about 10,000 to about 100,000. It should be understood that one skilled in the art could adjust these molecular weight limitations and ratios to produce a host of materials, ranging from soft, relatively weak (tensile at break of about 500 psi) adhesive substrates, through tough thermoplastic elastomers, to plastics. Because these materials are branched, they are more easily processed than their linear counterparts.

The amount of lithium employed depends on several factors such as the purity of the polymerization system, purity of the DVB and the molecular weight of each block of the diblock polymer desired. Typically, from 0.001 to 0.2 part of the lithium initiator is used per 100 parts of the monomer to be polymerized.

The temperature at which the block polymers are formed is not critical and may vary from a low of about 0° C. to a high of about 150° C.

It should be pointed out there are two groups of polar compounds useful in the present invention. One group of polar compounds are the so-called strong donors or modifiers. They are ethylene glycol dimethyl ether (glyme), diethylene glycol dimethyl ether (diglyme), both of which are preferred, triethylene glycol dimethyl ether (triglyme), tetraethylene glycol dimethyl ether (tetraglyme), 2,3-dimethoxybutane, N,N,N',N'-tetramethylethylene-diamine (TMEDA), also preferred, tri-n-butylphosphine and hexamethylphosphoric triamide (HMPA), in which the molar ratio of the said polar compounds to the active lithium ranges from about 0.01/1 to about 20/1.

A more preferred molar ratio of the strong donors range from about 1/1 to about 5/1 of the strong donor compounds to the active lithium catalyst employed.

Another group of polar compounds are also useful in the invention. However, these compounds require a higher level to be as effective and are referred to as weak donors or modifiers. They are selected from the group consisting of tetrahydrofuran, preferred, diethyl ether, triethylamine, 1,4-diazabicyclo-2.2.2-octane (DABCO), also preferred, p-dioxane, tri-n-butylamine and N,N'-dimethylpiperazine, in which the molar ratio of the said polar compounds to the active lithium ranges from about 0.5/1 to about 100/1.

A more preferred molar ratio of the weak donors range from about 4/1 to about 50/1 of the weak donor compounds to the active lithium catalyst employed.

The polyvinyl aromatic coupling compound useful in the invention are selected from the group of o, m and p-divinylbenzene, 1,2,4-trivinylbenzene, 1,8-divinylnaphthalene, 1,2-divinyl-3,4-dimethylbenzene, 2,4-divinylbiphenyl, 3,5,4'-trivinylbiphenyl and 1,3,5-trivinylbenzene. They are usually employed in amounts to give from about 1.0 to about 6 vinyl groups per mole of active lithium catalyst used, in which the living polymer.

The practice of this invention is further illustrated by reference to the following examples which are intended to be representative rather than restrictive of the scope of the invention. Unless otherwise indicated, all parts and percentages are by weight.

EXAMPLE 1

Polystyrene-polybutadiene branched copolymers containing 35 percent polystyrene were prepared by copolymerizing butadiene and small amounts of divinylbenzene with polystyryllithium initiator at 65° C. in cyclohexane, in accordance with the procedure of U.S. Pat. No. 3,949,020. The living polymer or the polymers containing the active lithium were treated with diglyme after nearly all of the butadiene had been polymerized.

A premix solution of styrene in cyclohexane in an amount to produce a weight percentage of styrene of 30.7 was purified and collected in an 8 oz. polymerization vessel. To this was added sufficient sec-butyllithium to give a 20,000 molecular weight polystyryllithium catalyst.

A premix solution of butadiene in cyclohexane was purified and charged into a series of 4 oz bottles giving a butadiene weight percentage of 11.4. The divinylbenzene, ranging from 0.5 to 4 moles of DVB per mole of lithium to be employed, was added to each bottle. Sufficient polystyryllithium prepared as above was added under nitrogen to the butadiene-divinylbenzene solution in an amount to give a 37,000 kinetic molecular weight of polybutadiene. The polymerizations were carried out at 65° C. for various times, the minimum time being that at which at least 95 percent of the butadiene had polymerized. After various polymerization times the diglyme was injected into the polymerization bottles at a diglyme to lithium mole ratio of 4/1. The polymerizations were allowed to continue for additional periods of time before being terminated with a methanol solution of a phenolic antioxidant. The polymers were then vacuum dried and submitted for various analyses. The DVB/Li ratio, the polymerization time in minutes, the diglyme post-treatment time in minutes, the tensile strength at 100 and 300 percent elongation, the tensile at break, the elongation at break and the DSV are reported in Table 1.

The samples for the tensile measurements were premolded at 148.9° C. for one minute at $6.895 \times 10^7$ Pa. The samples were then remolded at 148.9° C. for a period of 10 minutes at a pressure of $27.58 \times 10^7$ Pa and then cooled rapidly under pressure. The dilute solution viscosities were run in toluene at 30° C. and the tensile and elongation were obtained on 2.54 mm dumbbell samples with an Instron tensile testing machine operated at 12.7 cm per minute at 23.9° C. (Instron is a registered trademark) Polymer samples selected at random were analyzed by Nuclear Magnetic Resonance (NMR) analysis to confirm that the triblock copolymers contained 35 percent styrene.

The results and conditions are set forth in Table 1 below in which column 1 is the divinylbenzene (DVB)/lithium mole ratio; column 2 is the polymerization time in minutes; column 3 is the post-treatment time after the diglyme is added before the polymerization is short-stopped; column 4 is the 100 percent modulus of the polymers in Pascals; column 5 is the 300 percent modulus; column 6 is the tensile strength at break in Pascals; column 7 is the ultimate percent elongation at break (Tb); column 8 is the dilute solution viscosity (DSV) in toluene at 30° C.

TABLE I

| DVB/Li | Pzn Time, Min | Post-Treatment Time, Min | 100% M, kPa | 300% M, kPa | MPa Tb | Eb, % | DSV |
|---|---|---|---|---|---|---|---|
| 4.0 | 30 | — | 2427 | 2923 | 14.88 | 1120 | 0.76 |
| 4.0 | 30 | 5 | 3172 | 5875 | 28.05 | 640 | 1.25 |
| 4.0 | 60 | — | 2958 | 4840 | 23.63 | 722 | 0.94 |
| 4.0 | 60 | 5 | 4165 | 9750 | 22.82 | 595 | 1.38 |
| 4.0 | 60 | 10 | Gelled | | | | |
| 4.0 | 90 | — | 2379 | 3654 | 28.39 | 780 | 1.10 |
| 3.0 | 30 | 7 | 2724 | 6206 | 30.34 | 660 | 1.28 |
| 3.0 | 60 | 3 | 3158 | 6674 | 25.64 | 713 | 1.27 |
| 3.0 | 60 | 7 | 2896 | 7157 | 12.26 | 440 | 1.61 |
| 3.0 | 60 | 10 | Gelled | | | | |
| 3.0 | 90 | — | 2358 | 4171 | 26.22 | 785 | 1.13 |
| 2.0 | 30 | 5 | 2055 | 4758 | 25.62 | 800 | 0.99 |
| 2.0 | 30 | 10 | 2586 | 4240 | 28.27 | 720 | 1.10 |
| 2.0 | 60 | 5 | 2696 | 5040 | 24.45 | 742 | 1.17 |
| 2.0 | 60 | 11 | 2689 | 6516 | 14.01 | 495 | 1.57 |
| 2.0 | 90 | — | 2296 | 3310 | 23.17 | 860 | 1.07 |
| 1.0 | 30 | 7 | 1862 | 2586 | 21.31 | 878 | 0.82 |
| 1.0 | 30 | 15 | 2006 | 2992 | 20.55 | 875 | 0.90 |
| 1.0 | 60 | — | 1931 | 2289 | 4.39 | 888 | 0.71 |
| 1.0 | 60 | 5 | 1841 | 2986 | 22.06 | 885 | 1.16 |
| 1.0 | 60 | 15 | 2193 | 3448 | 25.88 | 870 | 1.04 |
| 1.0 | 90 | — | 1531 | 2055 | 16.18 | 1128 | 0.91 |
| 1.0 | 90 | 5 | 2255 | 4185 | 25.73 | 800 | 1.00 |
| 0.5 | 30 | 15 | 1820 | 2248 | 10.19 | 1135 | 0.76 |
| 0.5 | 30 | 15 | 1834 | 2399 | 13.13 | 1182 | 0.88 |
| 0.5 | 90 | — | 1020 | 1227 | 3.44 | 940 | 0.74 |
| 0.5 | 90 | 5 | 1600 | 1820 | 11.20 | 1118 | 0.85 |
| 0 | Too weak to test | | | | | | |

EXAMPLE II

In this example the experiment is designed to determine the residual weight of the dinvylbenzene and ethyl vinyl benzene in the polymer after the post-treatment with diglyme.

A polystyryllithium catalyst was prepared by reacting styrene 30.7 weight percent, in cyclohexane, with sufficient sec-butyllithium to give a 20,000 molecular weight polystyryllithium catalyst.

To a series of 118.3 cc bottles, a mixture of butadiene and cyclohexane was added to give 11.4 weight percent butadiene in the mixture. Divinylbenzene (DVB) which had been sparged with nitrogen and dried over 3-A molecular sieves was added at two different levels, 4/1 and 2/1 moles of DVB per mole of lithium catalyst. The polystyryllithium catalyst was added to the butadiene DVB solution in an amount to give a 37,000 kinetic molecular weight of the polybutadiene block. Polymerizations were carried out at 65° C. for various times. The diglyme which had been provided over 3-A molecular sieves was injected through a hole in the screw-cap of each of the bottles at 4/1 moles of diglyme per mole of lithium catalyst. Each of the bottles was replaced in the bath for an additional post-treatment time before being shortstopped. The polymers were vacuum dried. The residual amount of DVB and ethylvinyl benzene were determined by gas chromatographic analysis. The results are set forth in the table below in which column 1 is the DVB/lithium mole ratio. Column 2 is the polymerization time in minutes; column 3 is the post-treatment time after the diglyme is added, before the polymers were shortstopped; column 4 is the residual weight percent of divinylbenzene; column 5 is the residual weight percent of ethyl vinyl benzene.

TABLE 2

| DVB/Li | Pzn Time, Min. | Post-Treatment Time, Min. | Residual Wt % DVB | Residual Wt % EVB |
|---|---|---|---|---|
| 4/1 | 0 (initial level) | — | 0.149 | 0.103 |
| | 90 | — | 0.052 | 0.064 |
| | 30 | 6 | 0.002 | 0.055 |
| | 60 | 5 | 0.005 | 0.060 |
| 2/1 | 90 | — | 0.018 | 0.027 |
| | 30 | 5 | ND | 0.024 |
| | 60 | 5 | 0.001 | 0.028 |

ND - Not Determined

EXAMPLE III

In this example polystyrene-polyisoprene-polystyrene branched triblock copolymers of 17 and 30 percent styrene by weight were prepared by the copolymerization of isoprene and divinylbenzene (DVB) with polystyryllithium initiator. The procedure employed was similar to that of Example II except that isoprene was employed in place of butadiene. The amount of diglyme utilized in each of the experiments was 4 moles of diglyme per mole of lithium, and the time after the diglyme was added until the polymerization was shortstopped was 5 minutes in every case. The kinetic molecular weight of the polyisoprene block of the polymers containing 17 percent styrene was 61,000 and the kinetic molecular weight of the polyisoprene plus containing 30 percent by weight styrene was 29,000. The results are set forth in the table below in which column 1 is the weight percent styrene; column 2 is the divinylbenzene/lithium mole ratio; column 3 is the polymerization time in minutes; column 4 is whether or not diglyme was added—a minus indicates no diglyme; a plus indicates diglyme was employed. Column 5 is the dilute solution viscosity (DSV) as mixed in toluene at 30° C.; column 6 is the residual weight percent of divinylbenzene; column 7 is the 100 percent modulus in kPa; column 8 is the 300 percent modulus in kPa; column 9 is the tensile strength at break in MPa; column 10 is the ultimate elongation at break.

TABLE 3

DSV, Residual DVB and Tensile Data for S-I-DVB Block Polymers Treated with Diglyme (12.500 m wt p Sty; cyclohexane; 4.0 Diglyme/Li)

| % Sty | DVB/Li | Pzn Time Min | Diglyme | DSV$^a$ | Residual DVB, Wt % | 100% M, kPa | 300% M, kPa | MPa Tb | Eb, % |
|---|---|---|---|---|---|---|---|---|---|
| 17 | 1.5 | 90 | — | 1.35 | 0.006 | 614 | 883 | 7.96 | 1300 |
| | | 30 | + | 1.14 | 0.002 | 614 | 931 | 7.45 | 1560 |
| | | 60 | + | 1.67 | 0.002 | 855 | 1420 | 14.22 | 1240 |
| | 0.75 | 90 | — | 1.06 | 0.002 | 407 | 634 | 3.92 | 1380 |
| | | 30 | + | 0.93 | 0.001 | 352 | 496 | 2.68 | 1480 |
| | | 60 | + | 1.32 | ND | 621 | 958 | 11.17 | 1580 |
| 30 | 1.5 | 90 | — | 0.76 | 0.003 | 1958 | 3406 | 22.55 | 1210 |
| | | 30 | + | 1.04 | 0.001 | 2124 | 4551 | 24.46 | 1050 |
| | | 60 | + | 1.39 | 0.001 | 2455 | 6316 | 25.36 | 977 |
| | 0.75 | 90 | — | 0.73 | 0.001 | 1986 | 3385 | 13.75 | 1282 |
| | | 30 | + | 0.94 | 0.001 | 1779 | 2937 | 13.32 | 1332 |
| | | 60 | + | 1.08 | ND | 1524 | 3061 | 20.54 | 1185 |

$^a$Toluene, 30° C.

While certain representative embodiments and details have been shown for the purpose of illustrating the invention, it will be apparent to those skilled in this art that various changes and modifications may be made therein without departing from the scope of the invention.

What is claimed is:

1. A process for the preparation of thermoplastic block polymers which comprises contacting conjugated diolefinic monomers selected from the group consisting of isoprene, piperylene, 2-ethyl-1,3-butadiene, 2,3-dimethyl-1,3-butadiene and 1,3-butadiene, mixed with at least one polyvinyl aromatic coupling compound selected from the group consisting of o, m and p-divinylbenzene, 1,2,4-trivinylbenzene, 1,8-divinylnaphthalene, 1,2-divinyl-3,4-dimethylbenzene, 2,4-divinylbiphenyl, 3,5,4'-trivinylbiphenyl and 1,3,5-trivinylbenzene under solution polymerization conditions with a polystyryllithium catalyst which has been prepared by reacting an alkyllithium compound with a styrene monomer selected from the group consisting of styrene, alpha-methylstyrene, p-methylstyrene, p-t-butylstyrene, 3-methylstyrene, 1-vinylnaphthalene, in which an amount of polyvinyl aromatic coupling compound ranges from about 1.0 to about 6 vinyl groups of the polyvinyl aromatic coupling compound per mole of active lithium catalyst used, to produce a living polymer and then subsequently contacting said living polymer with (a) a polar compound selected from the group consisting of ethylene glycol dimethyl ether, diethylene glycol dimethyl ether, triethylene glycol dimethyl ether, tetraethylene glycol dimethyl ether, 2,3-dimethyoxybutane, N,N,N',N'-tetramethylethylenediamine, tri-n-butylphosphine and hexamethylphosphoric triamide, in which the molar ratio of the said polar compounds to the active lithium, based on the amount of said polystyryllithium catalyst present at the start of the polymerization, ranges from about 0.01/1 to about 20/1 or (B) a polar compound selected from the group consisting of tetrahydrofuran, diethyl ether, triethylamine, 1,4-diazabicyclo-2.2.2-octane, p-dioxane, tri-n-butylamine and N,N'-dimethylpiperazine, in which the molar ratio of the said polar compounds to the active lithium, based on the amount of said polystyryllithium catalyst present at the start of the polymerization, ranges from about 0.5/1 to about 100/1.

2. A process according to claim 1 in which the conjugated diolefin is butadiene or isoprene.

3. A process according to claim 1 in which the polystyryllithium is prepared from styrene or alphamethylstyrene and n-butyllithium or sec-butyllithium.

4. A process according to claim 1 in which the polar compound of (A) is glycol dimethyl ether, diethyl glycol dimethyl ether or N,N,N',N'-tetra-methylethylenediamine.

5. A process according to claim 1 in which the polar compound of (A) is tetrahydrofuran or 1,4-di-azabicyclo-2.2.2-octane.

6. A process according to claim 1 in which the vinyl groups in the amount of polyvinyl aromatic coupling compound ranges from 2.0/1 to 4/1 vinyl groups per mole of active lithium catalyst employed.

7. A process according to claim 4 in which the molar ratio of the polar compound of (A) to the active lithium employed ranges from the mole ratio of 1/1 to 5/1.

8. A process according to claim 5 in which the molar ratio of the polar compound of (B) to active lithium catalyst employed ranges from about 4/1 to about 50/1.

9. A process according to claim 1 wherein the conjugated diolefin is butadiene or isoprene, the polystyryllithium catalyst is prepared from styrene or α-methylstyrene, the polar compound is glycol dimethyl ether or diethyl glycol dimethyl ether or N,N,N',N'-tetramethylethylenediamine and the polyvinyl aromatic coupling compound is divinylbenzene.

10. A process according to claim 1 in which the conjugated diolefin is butadiene or isoprene, the polystyryllithium is prepared from styrene or α-methylstyrene, the polar compound is tetrahydrofuran or 1,4-diazabicyclo-2.2.2-octane and the polyvinyl aromatic coupling compound is divinylbenzene.

* * * * *